United States Patent Office 2,916,491
Patented Dec. 8, 1959

2,916,491
ACYLATED 3,6-PYRIDAZINEDIONES

David Stefanye, Frederick, Md., William L. Howard, Lake Jackson, Tex., James W. Brown and Robert L. Weintraub, Frederick, Md., assignors to the United States of America as represented by the Secretary of the Army No Drawing. Application July 17, 1957
Serial No. 672,523

4 Claims. (Cl. 260—250)

(Granted under Title 35, U.S. Code (1952), sec. 266)

The invention described herein may be manufactured and used by or for the Government of the United States of America for governmental purposes without the payment to us of any royalty thereon.

This invention relates to the lower straight chain alkyl esters of 1,2 dihydro-pyridazine 3,6-dione.

The preferred method of producing these esters is the acylation of a 1,2 dihydro-pyridazine-3,6-dione, or an alkali salt thereof with a lower alkyl chloro-formate in a dilute aqueous sodium hydroxide solution. The reactions may be represented as follows:

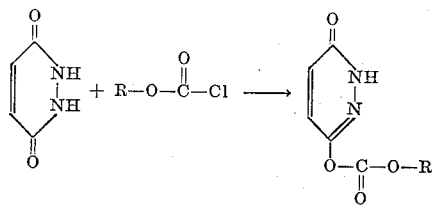

R is a lower straight chain alkyl group.

EXAMPLE I

Maleic hydrazide (0.1 mol) is dissolved in a solution of 0.1 mol of potassium hydroxide in water (75 ml.) with slight heating to aid solution. A lower alkyl chloroformate is added after cooling to room temperature, and the resulting mixture is shaken for two hours. The reaction mixture is then filtered and washed with 200 ml. of ligroine, and the filtered solid material recrystallized from a suitable solvent to yield the ester.

For example, if ethyl chloroformate is used to acylate 1,2-dihydro-3,6-pyridazine dione, the ester, ethyl 2,3-dihydro-3-oxo-6-pyridazinyl carbonate is formed, which readily crystallizes from benzene without solvent of recrystallization; or if benzoyl chloride is used, the ester 2,3-dihydro-3-oxo-6-pyridazinyl benzoate is formed which readily crystallizes from alcohol without solvent of recrystallization.

Higher homologs, such as prepared from the interaction of amyl chloroformate and maleic hydrazide, are liquids at room temperature and may be purified by distillation under reduced pressure.

Table

| Acylating Agent | Pyridazinedione | Ester Product | Melting Point, °C. |
|---|---|---|---|
| Ethyl chloroformate. | Maleic hydrazide. | Ethyl-2,3-dihydro-3-oxo-6-pyridazinyl carbonate $C_7H_8N_2O_4$. | 106–108 |
| n-Propyl chloroformate. | -----do--------- | n-Propyl-2,3-dihydro-3-oxo-6-pyridazinyl carbonate $C_8H_{10}N_2O_4$. | 79– 81 |
| n-Butyl chloroformate. | -----do--------- | n-Butyl-2,3-dihydro-3-oxo-6-pyridazinyl carbonate $C_9H_{12}N_2O_4$. | 84– 85 |

These compounds have been found to have excellent properties as herbicides in inhibiting the growth of various types of broadleaved and cereal species. In establishing the herbicidal properties of these compounds, tests were made by spray presentation on the plants and by root elongation tests on sprouts. The spray presentation test, which is designed for primary screening of chemicals, was carried out as follows:

Four broadleaved and two cereal species—Black Valentine Beans, Lincoln Soybeans, Heavenly Blue Morningglory, Scarlet Globe Radish, Clinton Oats, and Collusa Rice—are grown from seed in a 2–1 soil-sand mixture in metal window boxes (3 species per box) in a greenhouse. About one week after planting and about four days after emergence these species are sprayed with test compounds at rates of 0.1 and 1.0 lbs./acre. A pair of window boxes containing the six species are sprayed with each rate of each compound.

The compounds are prepared in acetone solutions containing 1% Tween 20, or other suitable wetting agent, or where they are not soluble in acetone, water plus 1% Tween 20 is tried as a solvent. When a compound is not sufficiently soluble to test in either of these solutions and is not a liquid itself, it is applied as a dust by weighing the desired amounts into gelatin capsules which are then fired from a muzzle adaptor of a $CO_2$ pistol into a chamber containing the test plants. The adaptor shatters the capsule on firing. Immediately prior to this dry application the plants are sprayed with water containing 1% Tween 20.

After the plants are sprayed or dusted, they are grown in a greenhouse for a period of two weeks. At the end of this period the fresh weights of the plant tops are obtained and the percent inhibition calculated for each of the test compounds on each of the test species based on the growth of untreated control plants according to the following formula:

$$\frac{C-T}{C} \times 100 = \text{percent inhibition}$$

where:

$C$=fresh weight of untreated plants 2 weeks after treatment.

$T$=fresh weight of treated plants 2 weeks after treatment.

Root elongation tests which are also designed for primary screening of compounds were carried out in the following manner:

The method of growing seeds of the above species consists of preparing 3-inch wide strips of Whatman #1 filter paper, either 9 or 18 inches long (depending on seed size), upon which an equal length of ½-inch wide pressure-sensitive tape is placed along one edge. A ½-inch strip of filter paper about 2 inches shorter than the pressure tape and having ¼-inch diameter holes on ½-inch or 1-inch centers is mounted on top of the pressure tape. Fifteen individual seeds of a species are then spotted on the exposed portions of the tape, the filter paper rolled with the seeds inside, and the roll held closed by the extra length of pressure tape. These rolls are then up-ended in 4-inch high paper drinking cups which contain 70 ml. of solution to be tested. The paper cups are then placed in metal trays 22 x 19 x 6 inches having perforated false bottoms and containing a ½-inch layer of water. The trays are covered with glass and serve as humidity chambers. The trays are kept at a temperature of 82–85° F. for 72 or 96 hours (depending upon the particular species), after which period the seed rolls are opened and the root lengths measured to the nearest centimeter. Of the fifteen seeds planted, measurements are taken of the ten seeds producing the longest roots. The average root length of the group of ten seeds is used for computing the percent inhibition of root elongation on an untreated control basis:

$$\frac{(C-T)}{C} \times 100 = \text{percent inhibition}$$

Where root elongation is obviously affected for some reason other than the presence of a test compound (e.g., profuse fungal contamination or control root lengths less than an average of 5 cm.), the test is rerun. When only a few seeds of a roll are contaminated, the root lengths of the remaining longest roots are obtained. If less than 7 seeds are suitable for measurement the test is rerun. It is estimated that at least 90% of the rolls have 10 roots of acceptable lengths.

The test solutions are prepared from a 2,000 p.p.m. (parts per million) stock solution of a compound in 100% acetone, so that the final concentrations for testing are 0.1, 1, and 10 p.p.m. aqueous solutions containing 0.5% acetone. A standard solution of 2,4-D is tested routinely on each species each time at the 1 p.p.m. level. Each test also contains an untreated control consisting of 0.5% acetone in tap water.

The results of these tests on several of the disclosed compounds are shown in the following table:

*Results of tests of lower straight chain alkyl esters of 1,2 dihydro pyridazine-3,6 dione*

| Spray Presentation Test On Plants → | Butyl-2,3-dihydro-3-oxo-pyridazinyl-6-carbonate | | Propyl-2,3-dihydro-3-oxo-pyridazinyl-6-carbonate | | Ethyl-2,3-dihydro-3-oxo-pyridazinyl-6-carbonate | |
|---|---|---|---|---|---|---|
| Application (lbs./acre) | .1 | 1 | .1 | 1 | .1 | 1 |
| B.V.B.[1] | | | 36 | 95 | 7 | 99 |
| Soybean | 37 | | 47 | 97 | 0 | 97 |
| Sunflower | 26 | | −4 | 66 | 3 | 57 |
| Radish | | | −20 | 70 | −20 | 10 |
| Oats | 21 | | −6 | 81 | 0 | 53 |
| Rice | −12 | | −9 | 18 | −9 | 27 |

[1] Black Valentine Beans.
Values given are in percent inhibition of growth. Negative values indicate accentuation of growth.

Further evidence of the effectiveness of these esters is shown in the following tests where the numerical rating has the following effect:

1—No effect
2—Slight effect
3—Moderate effect
4—Severe effect that the terms appearing at the head of the table have the following significance:

Formative effect: Twisting, wilting and other deformation.
Chlorosis: Spotting due to removal of pigmentation.
Contact injury: Burning or other injury at points where spray contacted plant.
Stunting: Diminutive or dwarf formations.
Necrosis: Deadening of tissue.

| Plant | Formative Effect | Chlorosis | Contact Injury | Stunting | Necrosis | Compound |
|---|---|---|---|---|---|---|
| Black Valentine Bean | 3 | 1 | 1 | 2 | 1 | Buty-2,3-dihydro-3-oxo-pyridazinyl-6-carbonate. |
| Soy Bean | 1 | 1 | 1 | 4 | 1 | |
| Morning Glory | 2 | 1 | 1 | 1 | 1 | |
| Radish | 1 | 1 | 1 | 1 | 1 | |
| Black Valentine Bean | 3 | 1 | 1 | 2 | 1 | Propyl-2,3-dihydro-3-oxo-pyridazinyl-6-carbonate. |
| Soy Bean | 1 | 1 | 1 | 4 | 1 | |
| Morning Glory | 2 | 1 | 1 | 1 | 1 | |
| Radish | 1 | 1 | 1 | 1 | 1 | |
| Black Valentine Bean | 3 | 1 | 1 | 2 | 1 | Ethyl-2,3-dihydro-3-oxo-pyridazinyl-6-carbonate. |
| Soy Bean | 1 | 1 | 1 | 4 | 1 | |
| Morning Glory | 2 | 1 | 1 | 1 | 1 | |
| Radish | 1 | 1 | 1 | 1 | 1 | |

These tests show the effectiveness of lower straight chain alkyl carbonate esters as herbicides. They are, moreover, more effective than the branched chain alkyl carbonate esters or the benzoate or sulfonate esters of 1,2 dihydro pyridazine 3,6 dione.

This application is a continuation-in-part of application Serial No. 482,322, now abandoned.

We claim:

1. A lower straight chain alkyl carbonate mono ester of 1,2 dihydro-pyridazine-3,6-dione.

2. Ethyl carbonate monoester of 1,2 dihydro-pyridazine-3,6-dione.

3. Propyl carbonate mono ester of 1,2-dihydro-pyridazine-3,6 dione.

4. Butyl carbonate mono ester of 1,2 dihydro-pyridazine-3,6-dione.

References Cited in the file of this patent

UNITED STATES PATENTS 2,614,917    Zukel et al. _____ Oct. 21, 1952